United States Patent [19]
Balke et al.

[11] Patent Number: 5,872,205
[45] Date of Patent: Feb. 16, 1999

[54] POLYMER SEGREGATION PROCESS

[76] Inventors: Stephen Thomas Balke, 2043 Jacamar Court, Mississauga, Ontario, Canada, L5L 3P7; Sibichen Joseph, 53 Oxford Street, Toronto, Ontario, Canada, M5T 1N8; Askar Karami, 30 Charles St. W. #619, Toronto, Ontario, Canada, M4Y 1R5; Dennis Pao-Chang Lo, 305-269 Finch Drive, Sarnia, Ontario, Canada, N7S 5A2; Mohammad Hadi Sayad, Apt #1502 40 Alexander Street, Toronto, Ontario, Canada, M4Y 1B5

[21] Appl. No.: 706,336

[22] Filed: Aug. 30, 1996

Related U.S. Application Data

[60] Provisional application No. 60/002,996 Aug. 30, 1995.
[51] Int. Cl.$^6$ .................................................. C08F 6/00
[52] U.S. Cl. ................... 528/502 F; 528/502 R; 528/503; 521/40.5; 521/47; 264/37; 264/510; 264/171.1; 264/210.5; 264/210.6; 264/237; 264/345; 264/348; 428/500; 428/516
[58] Field of Search ..................... 528/502 R, 502 F, 528/503; 523/201; 521/40.5, 47; 264/37, 171.1, 176.1, 210.6, 211.21, 211.23, 237, 345, 348, 510, 210.5; 428/500, 516

[56] References Cited

U.S. PATENT DOCUMENTS

| | | | |
|---|---|---|---|
| 3,642,129 | 2/1972 | McDaniel et al. | 209/159 |
| 4,410,482 | 10/1983 | Subramanian | 264/515 |
| 4,444,817 | 4/1984 | Subramanian . | |
| 5,053,258 | 10/1991 | Booze et al. . | |
| 5,188,784 | 2/1993 | Kamal et al. . | |

OTHER PUBLICATIONS

Morphology and permeability in Extruded Polypropylene/Ethylene Vinyl–Alcohol Copolymer Blends, G. W. Lohfink and M. R. Kamal, Polymer Engineering and Science, Mid–Nov. 1993, vol. 33, No. 21, pp. 1404–1420.

The Development of Laminar Morphology in Extruded Polyethylene/Polyamide Blends, Hamid Garmabi, M.R. Kamal, McGill University, Montreal, Quebec, Canada, pp. 1–5.

*Primary Examiner*—Fred Teskin
*Attorney, Agent, or Firm*—Lynn C. Schumacher; Dowell & Dowell, P.C

[57] ABSTRACT

The present invention provides a method enabling segregation of the various ingredients making up the polymer based products into component product streams and collection of these component streams so as to form individual product streams. Thus, according to this invention there is provided a process for purposefully segregating polymer-polymer and polymer-additive mixtures. The process for segregating the various combinations of components may be advantageously used on the one hand for the production of separate product streams from a mixture of polymers or polymer-additives in, for example, recycling of waste plastic based products, or on the other hand, in the production of polymer-polymer or polymer-additive layered structures exhibiting preselected spatial segregation of the various components. In its simplest form, the polymer segregation part of the process consists of a tube added to an extruder. During segregation, polymer layers containing different blend compositions are formed. Operating conditions are selected to enhance differences in viscosity between polymer components. This includes addition of low viscosity grades of one of the polymer components present to encourage migration of that component to the high shear region of the flow. Segregation may occur in either the extruder or in a tube added onto the end of the extruder, or in both. Preferential segregation of additives into one or more of the polymer layers can also be effected. Addition of components which attract the additives to be segregated provide a method of segregating a wide variety of additives.

32 Claims, 8 Drawing Sheets

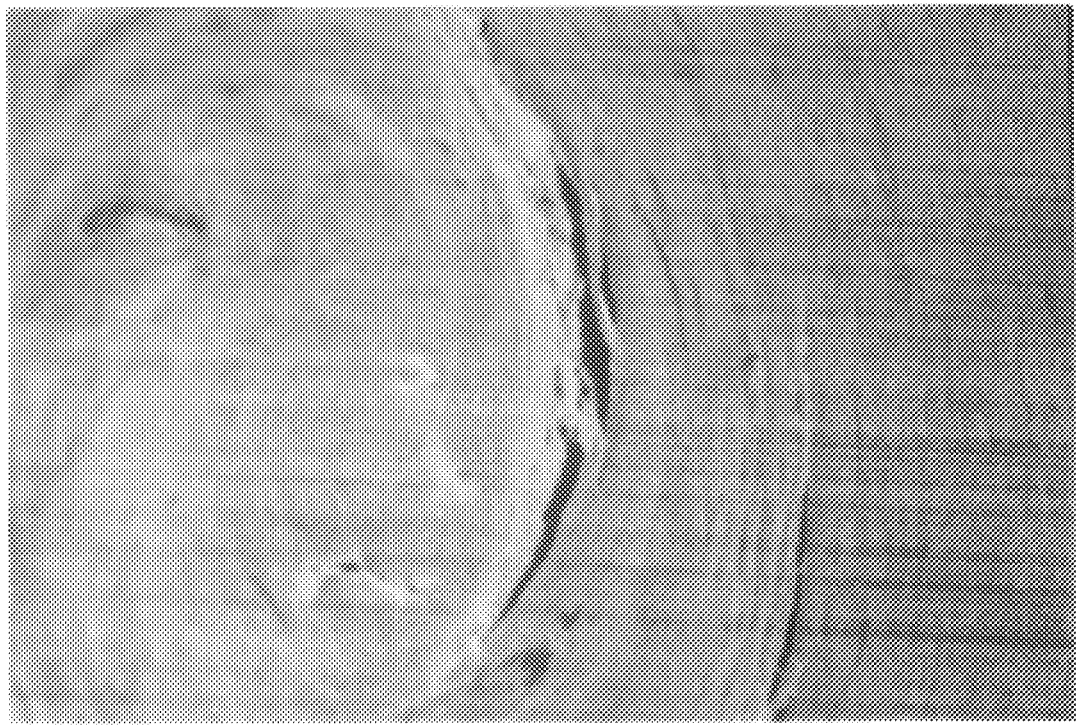
FIG. 4
FIG. 5
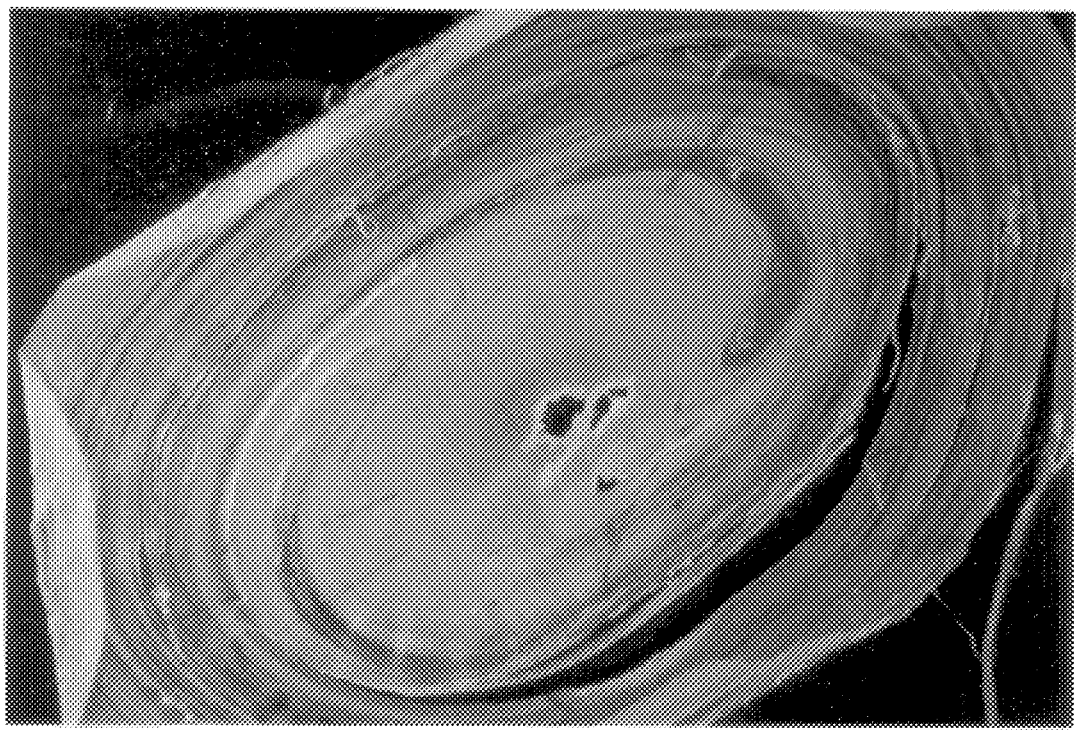

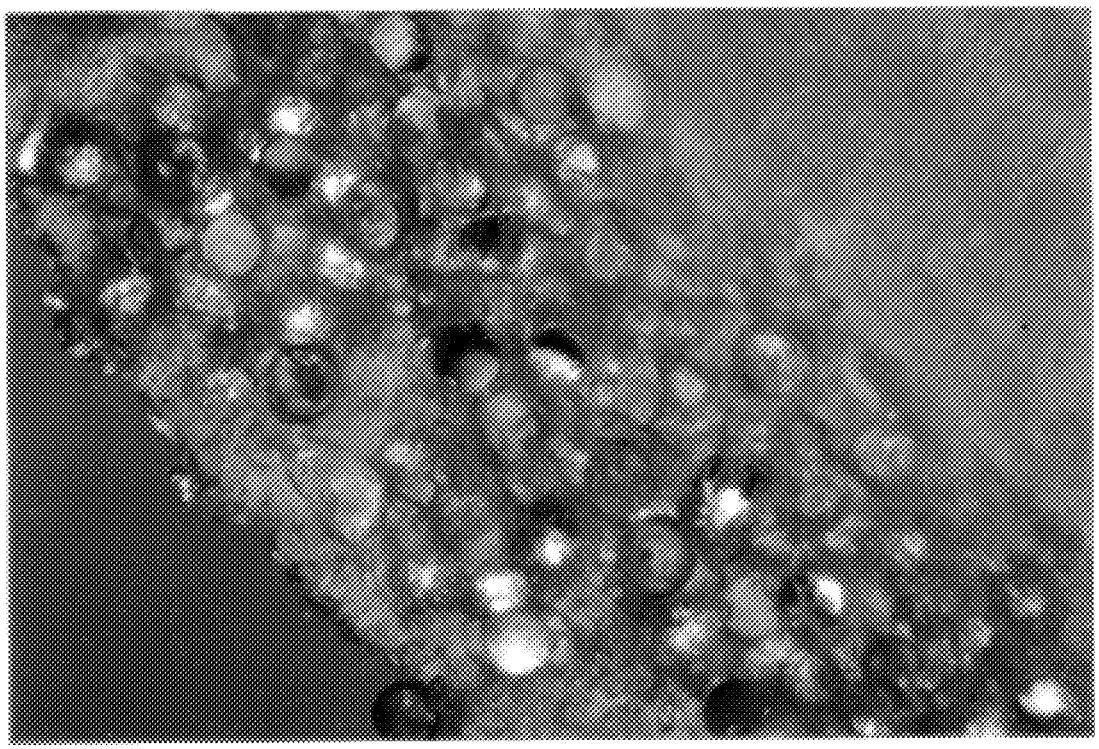
FIG. 6
FIG. 7
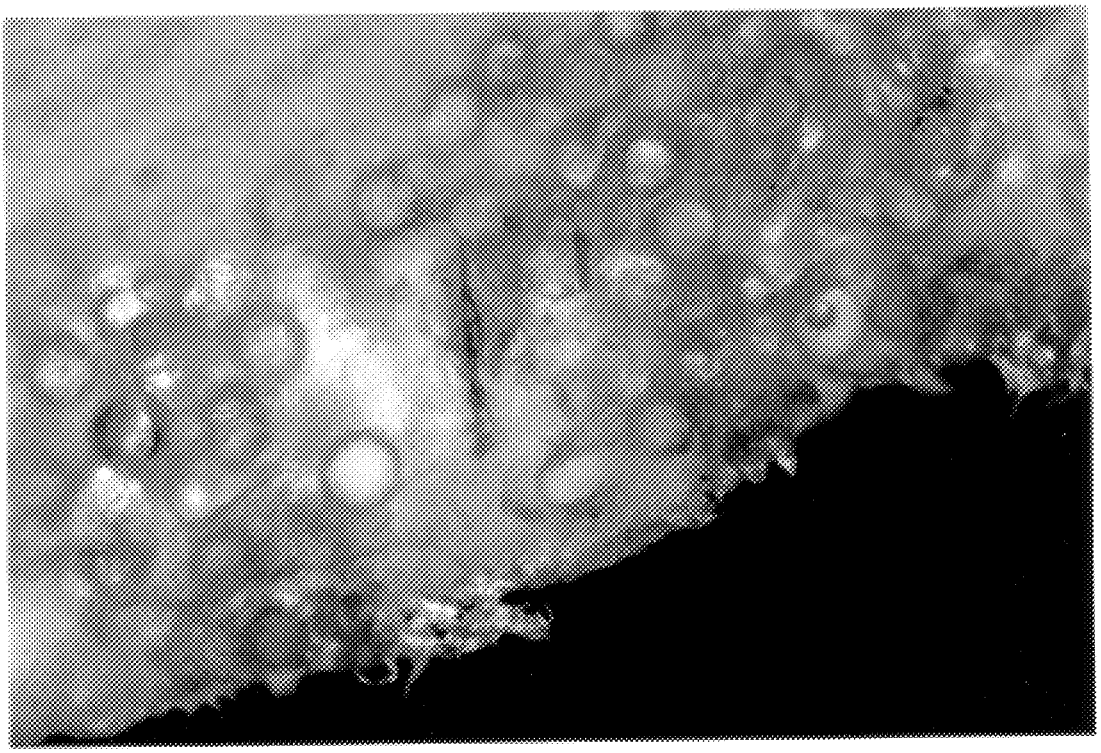

60/40 PS/HGX

70/30 FINA/HGX

60/40 PS/FINA

POLYMER SEGREGATION PROCESS

This application claims the benefit of U.S. Provisional application Ser. No. 60/002,996, filed Aug. 30, 1995.

FIELD OF THE INVENTION

The present invention relates to a method of segregating or separating different types of polymers and additives from each other in a flowing polymer melt during processing. More particularly the invention relates to separating polymer mixtures into desirable product streams, in for example, recycling of synthetic plastics or forming desirable polymer, or polymer/additive structures normally formed by co-extrusion.

BACKGROUND OF THE INVENTION

Description of the Prior Art

The Segregation Process

Polymer (and additive) segregation during melt flow of mixtures is a phenomenon which is generally considered a serious problem in the polymer industry because homogeneous mixtures are associated with good performance properties of the finished product. When a mixture of two immiscible polymers are flowing together in a system, the polymer with the lower viscosity will migrate to the region of higher stress. Although a variety of variables can affect the migration, the effect is often attributed to the "laziness of nature" or the "principle of energy minimization". Shear stress is the product of viscosity and shear rate. In fluid flow through a tube for example, the high shear rate area is adjacent to the wall of the tube and the low shear rate area is at the centre of the tube so that in this case, the low-viscosity component migrates towards the wall. The rate of this process depends upon the rate of change of stress across the tube.

The term additives in this document refers to: species previously added to improve performance of a finished product and no longer desirable in the case of recycling of the spent product; species previously inadvertently introduced into the polymers; species which appeared as a result of the manufacturing process (e.g. catalyst particles or microgel); species which have been added so that they can purposefully be located in a particular part of the polymer (e.g. a core of carbon particles may be desired). Additives can be soluble or insoluble in the polymer mixture. Additives of many types can segregate during flow. "Blooming", "bleeding" and "migration" are terms often used to describe the undesired segregation of plasticizers, dyes, etc. in polymer. The term polymer mixture in this document refers to any combination of polymers together or polymers and additives together.

Migration of particulate additives towards the centre of a tube during flow of particle in liquid suspensions through a tube can occur. One explanation for this effect is that any particle in the stream will have a slightly higher velocity on one side of it (the side closer to the axis of the tube) than on the other side. This causes a difference in pressure ("the Magnus effect") which pushes the particle towards the centre of the flow stream. Particle shape, particle size, particle deformability, particle concentration and the non-newtonian, viscoelastic nature of polymer melts provide additional variables. The effect causes difficulties in attempts to measure the viscosity of particle suspensions. Also, migration of filler particles during injection molding has caused important non-uniformities in molded parts.

There are a few areas where segregation is desired and used. The addition of water to heavy viscous crude oil in long pipelines has long been known to greatly reduce the pressure drop and hence the pumping cost. The water has much lower viscosity than the crude oil and therefore migrates to the wall of the pipe where it functions as a lubricant. Additives such as lubricants, slip agents and mold release agents function because they migrate to the surface of the polymer during processing.

Extrusion of polymer blends to form laminar structures without co-extrusion is receiving increased attention. In the publications H. Garmabi and M. R. Kamal, "The Development of Laminar Morphology In Extruded Polyethylene/Polyamide Blends", Proceedings Annual Technical Meeting Of Plastics Engineers (ANTEC'95), Boston, Mass., May 7–11, 1995; and G. W. Lohfink and M. R. Kamal, "Morphology And Permeability In Extruded Polypropylene/Ethylene Vinyl-Alcohol Copolymer Blends", Polym. Eng. Sci., 33, 1404–1420 (1993) showed that such structures were formed in the converging portion of the die unit attached to the extruder. They emphasize the need for equal viscosities of the polymer components in order to obtain the desired structures. In contrast to their approach, in the process to be described herein, differences in viscosity are desirable to segregate polymers because they are used to obtain desired structures through migration of the dispersed phase.

Since with these few exceptions, segregation is considered undesirable, the overwhelming bulk of prior art is directed at improved mixing of polymers and additives. This invention views segregation as desirable and provides a process for purposefully inducing segregation of polymers and additives.

Generation of Desirable Separate Product Streams from a Mixture of Polymers

Polymers, especially synthetic plastics, can contain undesired components, or higher concentrations of normally desirable components, that impair performance properties. These components are typically other polymers and additives (e.g. pigments and fillers). The situation is particularly acute for recycled plastics because they often originate from diverse sources. In recycled plastics the components of most interest are the types of polymers present. Thus, in conventional processing of such plastics, the waste is sorted manually according to the type of plastic. This is followed by washing, grinding, extrusion and pelletizing separately for each type.

The field of waste recycling is an area of considerable social and economic concern. The economic viability of the industry depends upon development of effective and efficient sorting methods. Sophisticated methods currently under study directed at solving this problem include the use of near infrared spectroscopy with neural network software to speed identification to enable rapid (possibly robotic) sorting. Triboelectric separation of comminuted waste, sink-float procedures based upon density differences, use of powder hydrocyclones, solvent techniques based upon the differing solubility of polymers in different solvents, and the use of chemical markers for identification are all methods presently being investigated in this area.

A major drawback in plastic waste recycling is that at present none of these methods provide satisfactory segregation. The most common method, manual sorting, is highly manpower intensive and expensive. Also, separating polymer waste composed of intimately mixed blends of components or of laminated components is not possible with current methods, except perhaps those that are solvent based. For those, solvent recovery and dissolution times are issues. Therefore, it would be very advantageous to provide a simple and economical method for segregating various components of polymer products.

Formation of Desirable Polymer and Polymer-Additive Structures

Polymer products often demand specific structures. In the packaging industry, for example, multiple layer structures are common as they are required to provide gas barriers and the like. These layered structures are traditionally coextruded using several extruders and associated special dies. In recent years there has been a recognition that extrusion of polymer blends can sometimes form such structures. For example, U.S. Pat. No. 4,410,482 issued to Subramanian on Oct. 18, 1983 discloses that extrusion of a blend of polyolefin, condensation polymer and compatibilizer can be accomplished so as to elongate the dispersed polymer phase to form a multi-layer structure. It is emphasized that the dispersed phase should not have too large a particle size. More recently, U.S. Pat. No. 5,1888,784 issued to Kamal et al. teaches dispersed "bodies" of ethyl vinyl alcohol dispersed in polypropylene are elongated using a die unit to obtain a laminar structure including overlapping layers of the dispersed polymer in the matrix. In that case different screw designs are used to affect the dispersion and the die unit is used to lengthen the dispersed bodies in different directions. All of this prior art emphasizes the presence of a dispersed phase and the stretching of the shape of the dispersed phase in a die. As mentioned above, most recently Garmabi and Kamal (1995) have emphasized the importance of equal viscosities in the two polymer phases so that the dispersed bodies are more deformed in the die so that larger areas are obtained in the laminar layers.

In addition to layered structures of various polymers, structures incorporating various additives as layers can also be important. One notable application is in the formation of electrically conductive polymer structures. Polymers with resistivities <$10^6$ ohm-cm are considered to be conductive polymers. Conductivity of a polymer can be the result of (a) conjugated bond structures which when activated provide mobile electron clouds or (b) the presence of electrically and/or thermally conductive additives. Examples for such additives include, conducting carbon black (CB), metal powders (Fe, Al), metal fibers (Al, SiC), metal coated glass fibers and hollow glass spheres. These additives are mixed with the polymers during processing in sufficient concentrations to form continuous conducting pathways in the polymer matrix. The matrix polymers employed are decided mainly by the application. Polymers often include non polar elastomers such as polyisobutylene, polyisoprene and conventional engineering plastics such as polycarbonate, ABS etc. and blends thereof. Application of such filled conductive polymers include, electromagnetic interference shielding (EMI), radar frequency jamming, antistatic applications and circuit protection in microelectronics.

In most of these applications, it is not necessary to have the whole matrix conductive, but one conductive layer will be sufficient serve the purpose. By suitably selecting a bi- (or multi) component polymer system such that conductive particles will preferentially migrate to one of the polymer phases (say the core as in an injection molded article) and the other phase forming an insulating shell around the core, could be constructed. Such in situ core-shell conductive-insulating structures have significant commercial potential including the production of electronic items. This technology is all the more desired as it may help retain the same amount of surface finish as without fillers, by reducing the material cost, by obviating multistage processing.

It would therefore be very advantageous to provide a method of producing polymer based layered products which does not require coextrusion of the various constituents.

SUMMARY OF THE INVENTION

The present invention provides a method enabling segregation of the various ingredients making up the polymer based products into component product streams and collection of these component streams so as to form individual product streams. The individual product streams may still contain mixtures of materials but the individual product streams will be richer in certain components than the original mixture fed to the process.

Thus, according to this invention there is provided a process for purposefully segregating polymer-polymer and polymer-additive mixtures. The process for segregating the various combinations of components may be advantageously used on the one hand for the production of separate product streams from a mixture of polymers or polymer-additives in, for example, recycling of waste plastic based products, or on the other hand, in the production of polymer-polymer or polymer-additive layered structures exhibiting preselected spatial segregation of the various components.

In its simplest form, the polymer segregation part of the process consists of a tube added to an extruder. During segregation, polymer layers containing different blend compositions are formed. Operating conditions are selected to enhance differences in viscosity between polymer components. This includes addition of low viscosity grades of one of the polymer components present to encourage migration of that component to the high shear region of the flow. Segregation may occur in either the extruder or in a tube added onto the end of the extruder, or in both. Preferential segregation of additives into one or more of the polymer layers can also be effected. Addition of components which attract the additives to be segregated provide a method of segregating a wide variety of additives.

In the first application of this process, namely the generation of desirable separate product streams, a die is added to the tube in the process to "skim" one layer of polymer (or polymer containing additive) from another. Separate process streams of desired composition result.

In the second primary application of this process, formation of desired polymer structures, a die is added to the tube at the end of the extruder to produce the desired form of the product. The purpose of the die is to stretch and shape the preformed layered structure to the degree necessary for the final product. Final structures range from layered polymers to structures containing particles in predefined locations.

In one aspect of the invention there is provided a method for segregating constituents of polymer mixtures wherein the constituents comprise polymers and additives. The method comprises the steps of providing a polymer mixture, heating the polymer mixture until it is in a flowable state and flowing the polymer mixture in a first direction. The polymer mixture is segregated by inducing migration of at least one of the constituents relative to the other constituents of the polymer mixture in a direction substantially transverse to the first direction, and after a preselected amount of segregation solidifying the segregated polymer mixture.

In another aspect of the invention there is provided a method for recycling waste plastics containing constituents comprising polymers and additives. The method comprises the steps of providing a waste plastic, heating the waste plastic producing a flowable polymer mixture and flowing the flowable polymer mixture in a first direction. The polymer mixture is segregated by inducing migration of at least one of the constituents relative to the other constituents of the polymer mixture in a direction substantially transverse to the first direction. After a preselected amount of segregation the segregated portions are collected and solidified.

The present invention provides a method for producing a polymer based product having a layered structure with the product being formed from a mixture of constituents which comprise polymers and may comprise additives. The method comprises providing a polymer mixture and heating the polymer mixture until it is in a flowable state. The polymer mixture is segregated by inducing migration of at least one of the constituents relative to the other constituents of the mixture in a direction substantially transverse to the first direction. The polymer mixture is extruded and die formed and after a preselected amount of segregation extrudate is solidified.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

The process of the present invention will now be described, by way of example only, reference being had to the accompanying drawings, in which;

FIG. 4 is a photomicrograph showing polystyrene segregated from high density polyethylene where the polystyrene had a lower viscosity than the high density polyethylene, details of the process to giving this structure are provided in Example 3 described hereinafter;

FIG. 5 is a photomicrograph showing polypropylene segregated from high density polyethylene where the polypropylene had a lower viscosity than the high density polyethylene, details of the process giving this structure are provided in Example 4 described hereinafter;

FIG. 6 is a photomicrograph showing glass beads segregated from a mixture of high density polyethylene and ethylene vinyl acetate copolymer where the copolymer had a lower viscosity than the polyethylene, details of the process giving this structure are provided in Example 8 described hereinafter;

FIG. 7 is a photomicrograph showing glass beads and other unidentified particulates segregated from a mixture of recycled high density polyethylene and ethylene vinyl acetate copolymer where the copolymer had a lower viscosity than the polyethylene, details of the process giving this structure are given in Example 9 described hereinafter;

DETAILED DESCRIPTION OF THE INVENTION

Figure 1:
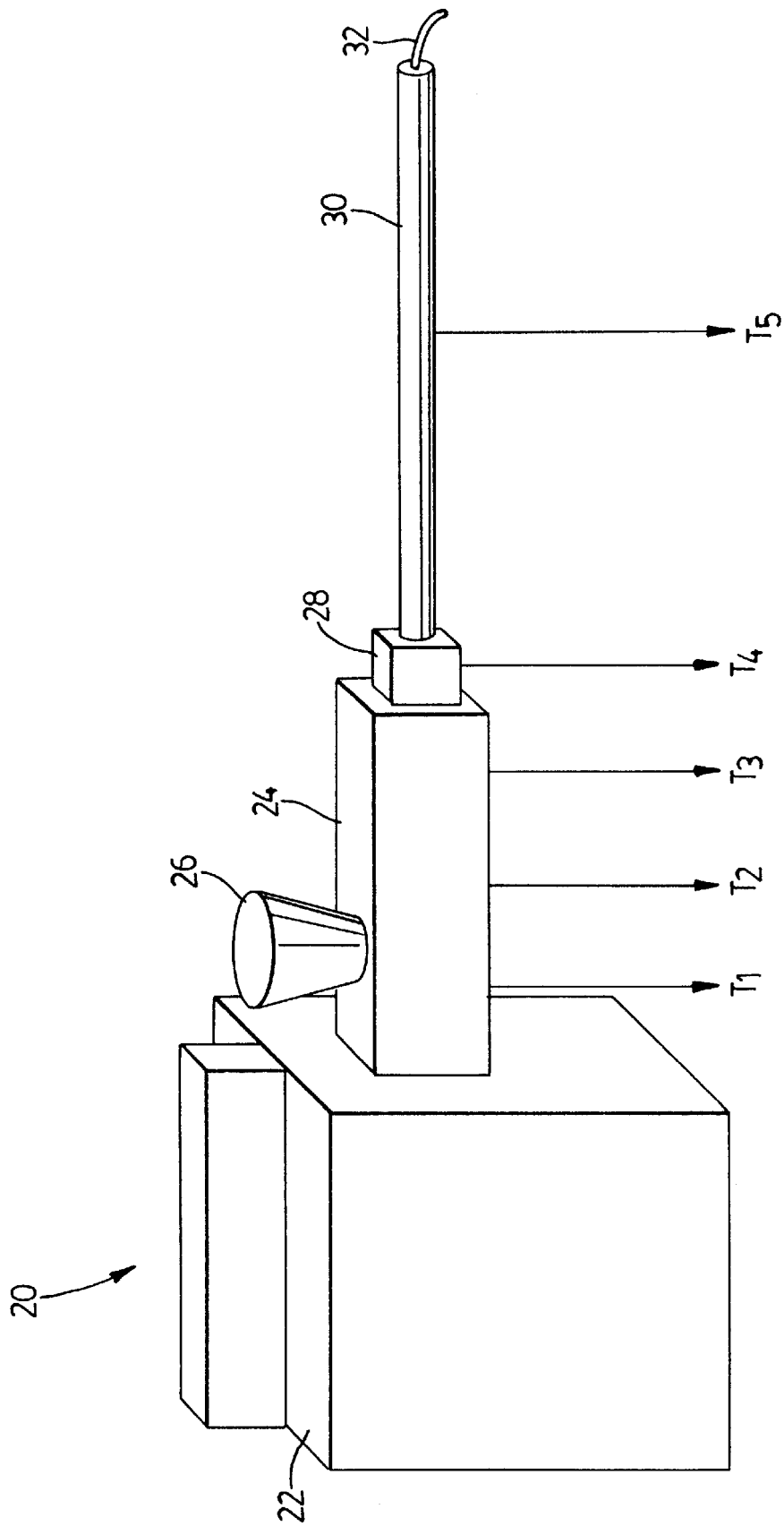
FIG. 1 is a schematic of an apparatus capable of accomplishing segregation of polymer and polymer-additive mixtures in accordance with the present invention.

In contrast to the prior art, this invention is directed to a process of producing polymer based products based upon utilizing segregation of polymer-polymer mixtures and polymer-additive mixtures as opposed to decreasing segregation as is common in the art. For example, in direct opposition to the polymer processing literature, the processes disclosed herein incorporate methods of enhancing differences in viscosity of the polymer components to effect segregation in the various mixtures.

There are two fundamental modes or configurations in which the present process may be operated, the first mode comprising polymer-polymer or polymer-additive segregation and individual stream collection used in waste recycling operations. The second mode comprises polymer-polymer or polymer-additive segregation and die forming for producing products. Combinations of these two modes are possible in combined applications. The polymer-polymer or polymer-additive segregation portion of the process is common to both modes of operation. It may be a conventional extruder run at appropriate conditions to encourage segregation (screw design, rate of rotation of the screw, temperature, etc.).

To encourage segregation in an extruder, a screw that accomplishes metering with minimal mixing is preferred. The absence of mixing flights (or kneading blocks in a twin screw extruder) is therefore desired. However, viscosity is influenced by both shear rate and temperature. This influence depends on the type of polymer as well as its molecular weight distribution, other molecular parameters and sometimes shear history as well. Thus, the influence is generally different for different polymers. Furthermore, the shear rate interacting with the fluid causes heat generation through viscous dissipation. For a given extruder, shear rate is dictated by extruder revolutions per minute (rpm) and screw dimensions. Thus, the screw design can also influence the segregation obtained by affecting the difference in viscosity of the polymers present in the mixture. The temperature of the polymer melt, whether caused by viscous dissipation or by external heaters, or both, can also influence the process of segregation through its influence on the viscosity of each of the constituents of the mixture. Data showing viscosity as a function of shear rate and temperature for the polymers to be segregated can be used to define required shear rates and temperatures to maximize viscosity differences without undesirable effects (e.g. polymer degradation or melt fracture). This requirement may be used together with the idea of minimizing mixing in order to give the preferred screw design, extruder rpm and temperature for a given set of constituents of a polymer mixture. The feed to the extruder also influences the amount of mixing. Larger particle size is preferred over smaller particles to minimize the coalescence required.

Those skilled in the art will appreciate that continuous mixers other than extruders may also be used, but extruders are more common. The inventors have discovered that the process of segregation is enhanced by the addition of adjuncts to the extruder. Specifically, addition of an elongated tube to the end of an extruder has enhanced segregation with segregation occurring in the tube as well as in the extruder.

Referring to FIG. 1, there is shown at 20 a modified extrusion system for conducting the process of the present invention. System 20 includes a drive unit 22 connected to a single screw in an insulated, heated barrel 24. A tube 30 is attached to the end of extruder 24 with an adapter 28 used to make the connection between the tube and the extruder. Temperature control at positions marked T1, T2, T3, T4 along the extruder and T5 on the tube 30 is achieved using standard heaters and temperature controllers, not shown. In addition, the temperature may also be controlled at several positions along tube 30.

The polymer mixture to be segregated is cut up into the preferred particle sizes, in the case of waste plastic being recycled, and placed into hopper 26. When the process is being used to produce layered structures from virgin materials the constituents of the polymer mixture, including polymers and additives, are placed in the hopper 26 in the desired proportions. The molten mixture is partly segregated in extruder 24 when there are different shear rates present between the rotating screw (not shown) and the stationary barrel wall of the extruder at any point along the extruder. As the polymer mixture is pumped through barrel 24 the lower viscosity polymer will migrate towards the regions of higher shear rate. Further segregation may be obtained in tube 30 and the segregated extrudate 32 exits from the end of tube 30.

Figures 2A, 2B:
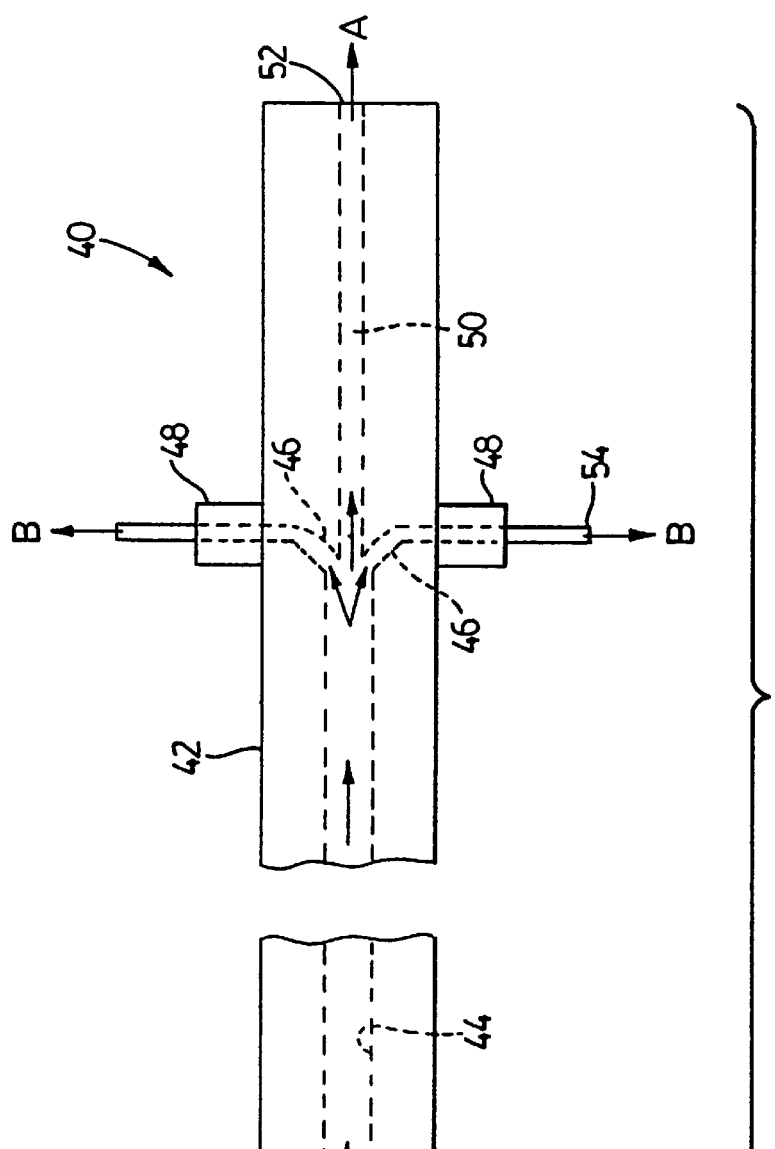
FIGS. 2A and 2B are cross section, broken, of a segregation tube equipped with a die used for collecting segregated product streams.

Referring to FIGS. 2A and 2B, shown at 40 is a segregation tube 40 equipped with a die used for collecting segregated product streams. The molten polymer mixture flows along channel 44 in tube 42 under conditions causing segregation in the polymer mixture. Upon reaching the die the inner core of the segregated mixture flows straight through becoming product stream A which exits the end of the tube. The outer shell of the segregated mixture is skimmed off from the core and redirected along channels 46 and out side exit ports 48 where it is collected. Valves to control the flow rate of the various molten streams, or gear pumps (or other means of applying suction) may be used to improve the efficiency of the collection. It will be appreciated that various refinements may be made in the geometry of the collector directed to decreasing mixing of the streams as they are collected, or allowing variable specification of the thickness of the outer shell being separated from the inner core.

To obtain segregation in tube 30 it is important to provide sufficient time for the segregation to occur. This is a function of the volume of the passageway in the tube and the flow rate of the polymer melt. The time required will depend upon the constituents comprising the polymer mixture and the extent of segregation to be achieved. Volume is directly related to the to the length and diameter of the tube. Diameter strongly influences on the separation because, in general, shear rate across the tube rapidly changes more on an absolute scale of distance for a small diameter tube than for a large one. This shear gradient relative to the size of the dispersed polymer or additives to be segregated will influence the amount of segregation. The internal geometry of the tube may also be adjusted to have an influence of segregation. For example, a converging section within the tube may be used to increase coalescence.

The present method of enhancing segregation may be achieved using any one or a combination of the following processing steps.

1) The addition of more of one of the polymer components already present in the blend in order to increase the viscosity difference between this component and the remaining components. Therefore, the use of non-reactive or reactive additives to encourage the desired segregation by inducing migration of a selected constituent is a very advantageous in the present process. Addition of a low molecular weight polymer miscible with one of the polymer constituents present to move the polymer to the wall of tube 30 is a specific example. However, any additive which can assist the segregation by encouraging migration of one or more constituents to a specific location of the flow field is included. Additives may be introduced at the feedport of the extruder or may be injected at various points downstream from the feedport, to be more fully discussed hereinafter. The use of multiple tubes in parallel or in a branched formation with one or more central tubes feeding side tubes and using multiple dies may also be used in the present method. Multiple smaller diameter tubes in place of one large diameter tube permits improved control of temperature. A branched formation of tubes allows downstream tubes to further separate individual layers that contain more than one component. For example, after the shell is skimmed from the first tube it can be further separated into a core and shell which can be individually collected.

2) The use of temperature programming to allow for the different change of viscosity with respect to temperature amongst the different components. As mentioned above, viscosity is strongly affected by temperature and the effect is different for different polymers. This fact is used in the present invention to achieve separations using temperature programming along the length of the extruder or segregation tube (also the flow path of the polymer mixture or melt). For example, if three polymers A, B and C to be separated have the same viscosity at temperature $T_A$ but the viscosity of polymer B differs from the other two at some higher temperature, $T_B$, and the viscosity of C differs from the other two at some still higher temperature, $T_C$, then, by changing the temperature along the direction of polymer flow to enhance the viscosity difference between B and A and C, polymer B is separated from polymers A and C and may be skimmed off first by a suitably placed collector. Further downstream tube 30 is heated to the higher temperature $T_C$ to separate polymer C from A. It will be understood that complete segregation of the different constituents is unlikely so that one stream will be enriched in A with some of B and C present, another stream is enriched in polymer B with some of A and C present, and a third stream C is obtained with some A and B present.

3) Chemical reactions with one or more of the components, for example, the injection of a free radical initiator into polypropylene/polyethylene blends during extrusion is well known to cause a decrease in the viscosity of the polypropylene (due to a degradation of molecular weight) and an increase in the viscosity of the polyethylene (due to chain branching and chain extension). Referring to FIG. 1, the initiator may be added at the feedport 26 of the extruder or added downstream directly into the polymer melt. Preselected amounts of the initiator may be added at preselected points along the extruder barrel 24 or segregation tube 30 so as to maximize the viscosity difference between the polymers to be separated. For example, if only one of the polymers in the mixture reacts with the initiator and this polymer (e.g. polypropylene) degrades and goes to the wall of the tube then injecting initiator downstream in the center of the tube will improve the chances the initiator being utilized by polymer which has not yet been segregated at that point (and not wasted on polymer that has already been segregated). This technique can be combined with temperature programming by careful selection of the initiator with the maximum reactivity at the particular temperature.

4) Addition of a polymer or other component to the blend which attracts additives to be segregated already present in the polymer. As mentioned above, the various methods of enhancing segregation may be employed in various combinations. For example, a polar low viscosity polymer may be added to attract glass particles to induce the glass particles to partition into the added polymer. The polymer then migrates with the glass particles to the high shear regions of the flow.

5) Control of radial migration of particles or droplets can be achieved under conditions of laminar flow. In laminar flow of viscous suspensions the ability of a particle to deform in a shear field is an important variable. For laminar flow in a tube, for example "Poiseuille Flow", in an effect known as the "tubular pinch effect" it has been found that rigid spherical particles consistently migrated to a radial position 60% of the distance between the centre and the wall. They formed an annular ring at this position. Deformable particles assume an ellepsoidal shape under a shear field. The resulting force component caused by the Poiseuille flow of the fluid is in the radial direction towards the centre of the tube. Thus, deformable particles tend to migrate to the centre of the tube. If the deformable particles are molten droplets of one polymer type suspended in another then this mechanism can be responsible for polymer segregation even if no difference in viscosity is present. If the deformable droplets consist of a polymer higher in viscosity than the matrix polymer then the two mechanisms (deformable droplet separation in Poiseuille flow and energy minimization) will add together to increase the effectiveness of the segregation. If the viscosity of the droplets is less than the matrix polymer then the two mechanisms can act in opposition to segregation effectiveness. Mechanical means can be used to alter the shear field and so affect the segregation. The screw in an extruder does this. Also, the segregation tube attached to the extruder may contain a spinning rotor or itself could be rotated.

Figure 3:
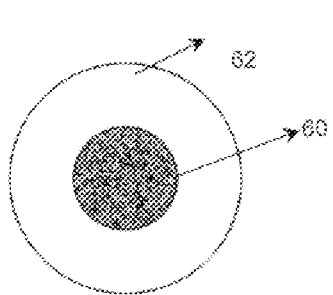
FIG. 3a is a cross sectional drawing of one type of layered structure formed using the process of the present invention showing a core and outer shell.
FIG. 3b is a cross sectional drawing of another type of layered structure showing a core, an inner shell and an outer shell.
FIG. 3c is a cross sectional drawing of a layered structure with a gradually varying concentration between a core region and outer shell formed using the present process.
Figure 3:
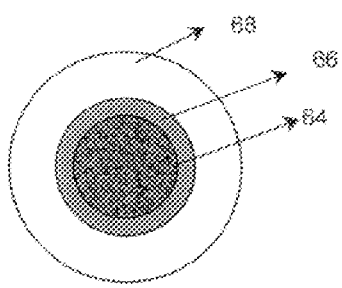
Figure 3:
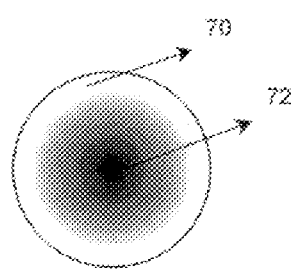

A wide variety of morphologies for the products produced using the present segregation method may be obtained. Three products each exhibiting a different morphology is shown in FIGS. 3a, 3b and 3c. In FIG. 3a the product has a core 60 and a shell 62 which are separated by a very distinct boundary. When the polymer mixture includes conductive particles which are sufficiently concentrated and these particles migrate into the core region a conductive core 60 is obtained with an insulating sheath 62. Formation of this type of structure is obtained when there is significant difference in the viscosity of the two polymers in the mixture, when the particles preferentially migrate to the core and when the constituent polymers in the blend have vastly different polarity so that the mixture is essentially immiscible.

FIG. 3b illustrates a core-shell structure with a core 64, an inner shell 66 and an outer shell 68. This type of structure is obtained by incorporating a third phase to the core-shell structure described in FIG. 3a. In order for the third phase to form an intermediate shell between the core and outer shell, a) its viscosity should be sufficiently different from that of the core and outer shell polymers, b) viscosity of inner shell 66 should be between that of core 64 and the outer shell 68, and c) all three polymers should have differ surface properties and polarity such that none of the phases form a miscible blend with the other two polymers during processing.

FIG. 3c illustrates a layered product exhibiting a diffuse shell-core structure where the outermost shell region 70 and the core region 72 are each enriched in different constituents with a gradient concentration of the constituents existing between the core and shell. For example, in the case in which the second polymer used in the mixture is partially miscible with the matrix resin and there is sufficient difference in the viscosity of the polymers, the structure of FIG. 3c is obtained in there is a gradually varying concentration in the radial direction. As used herein, the term "layered structure" means a product produced in accordance with the present process in which segregation of at least one of the constituents is obtained, regardless of the shape of the extrudate. For example, cylindrical structures with tree-ring segregation, cylindrical structures with distinct inner core and outer shell, or a flat planar structure obtained using die forming are all considered to be "layered structures" as defined herein.

To obtain adhesion between these layered structures it will sometimes be necessary to introduce a "compatibilizer" or "tie layer polymer" into the polymer mixture. The adhesion promoter often would locate at the interface between the layers because its chemistry encourages it to be there (e.g. in the case of a block copolymer for example where each bolck is soluble in one of the two repective polymer mixture components to be compatibilized). However, it is also possible to assist its migration by selecting a polymer promoter of viscosity intermediate between the viscosity of the two components that are to be compatiblized.

In the second configuration of the present invention the process is adapted for polymer segregation and die forming to obtain desired structures. In configuration II the polymer segregation portion of the process is essentially the same as in Configuration I. However, it will be understood that the starting materials will not necessarily be waste plastics but preferably are preselected polymer(s) and/or additives depending on the end product to be obtained. For example, virgin polymers and additives may be used. Although special die designs are possible and would be directed at manipulating the segregated layers, those skilled in the art will appreciate that many desirable structures may be formed from conventional dies normally used for single polymers, i.e. a capillary die may be used to form shell-core structures; a film die may be used to form layered structures, just to mention a few.

It will be appreciated that a key feature of the present invention is that segregation can be encouraged in the polymer melt and that this segregation can be used as the basis for producing either desired individual product streams or desired polymer structures or both. The flowable polymer mixture during flow is subjected to any one of a number of different processes, depending on the constituents of the polymer mixture, which essentially give at least one of the constituents a velocity component in a direction which is transverse to the direction of flow of the mixture (relative to the other constituents) during for example extrusion. In the specific case of extrusion through a tube this transverse direction will be in the radial direction. In this way segregation is achieved. In recycling of plastic waste the segregated streams can be physically separated and recycled and in the case of production of layered products separation of the segregated constituents into two streams is avoided.

The process of the present invention will now be illustrated by way of example only using several polymer-polymer and polymer-additive combinations. It will be understood that these examples are in no way to be viewed as limiting the scope of the invention. The first ten examples are using a segregation tube added onto the extruder, see FIG. 1. Examples 11 to 13 illustrate the process in the absence of a segregation tube. In the following examples, the wt % values were obtained by FTIR measurement of the core concentrations, estimation of the cross-sectional area of the core and the total cross-sectional area of the extrudate from photomicrographs and use of these data together with the known composition of the extruder feed to obtain the composition of the shell. This "mass balance" approach intentionally avoided the use of the direct composition measurement of the shell because such measurements were not as precise as the others.

Equations were:

wt % component A in the shell=100×(1−(wt. of component A in the core/total wt. of component A))

where wt. of component A in the core=(area of core)×(measured wt. % of component A in the core)/100 and total wt. of component A=(total cross sectional area)×(wt. % of component A in the feed)/100

EXAMPLE 1
HDPE-PS, Equal Viscosities, No Segregation

In this example, high density polyethylene (HDPE) (Fina 7208) was dry blended with polystyrene (PS) (Styron 688) in the ratio of 40 to 60 weight percentage respectively and fed to a single screw extruder with a metering screw which was equipped with a segregation tube. The segregation tube 30 (FIG. 1) includes a transition adapter 28 and individual pieces which screwed together to make up the entire tube length. All or some of the pieces could be used so that the L/D ratio could be varied. Temperature control was achieved throughout the extruder 24 and segregation tube 30 by PID controllers. Also, pressure transducers were used to monitor the pressure drop in-line across the segregation tube. The temperatures along the extruder barrel and segregation tube (T1, T2, T3, T4 and T5) were 150° C., 200° C., 200° C., 200° C. and 200° C. respectively. The extruder 24 was operated at 15 rpm. The viscosity ratio of the blend ($\eta_{PE}/\eta_{PS}$) at experimental conditions was very close to unity.

Samples were examined by using optical microscopy and FTIR spectroscopy to asses the morphology of the blend and to obtain composition information of core and shell of the blend, respectively. Fourier transform infrared (FTIR) analysis showed the core to contain approximately 63 wt % PS and approximately 37 wt % HDPE. Therefore, no significant segregation occurred because no difference in viscosity was present.

EXAMPLE 2
HDPE+PS (As In 1)+PS (Low Viscosity), Segregation

In this example, the experimental procedure and equipment was the same as Example 1 except that 20 wt % of very low viscosity polystyrene (Styron 615APR) was added to the feed as a segregation promoting additive. The segregation obtained is tabulated in TABLE I below.

TABLE I

| Feed | | Core | | Shell | |
|---|---|---|---|---|---|
| | (wt %) | | (wt %) | | (wt %) |
| HDPE(Fina 7208) | 40 | PS | 29 | PS | 71 |
| PS(Styron 688) | 40 | PE | 71 | PE | 29 |
| PS(Styron 615APR) | 20 | | | | |

EXAMPLE 3
HDPE+Low Viscosity PS, Viscosity Ratio 7, Segregation

In this example, pellets of polystyrene (Styron 615APR) and high density polyethylene (Fina 7208) with a composition ratio of 60 to 40 respectively was dry blended and fed to the polymer segregation process. The process was the same as in Example 1. However, now the temperatures along the extruder barrel and segregation portion were 155° C., 190° C., 190° C., 190° C., and 190° C. The extruder was operated at 20 r.p.m. The viscosity ratio of the blend ($\eta_{PE}/\eta_{PS}$) at experimental conditions was seven. The optical photomicrograph of the cross-section of the extrudate obtained by the process is shown in FIG. 4. A white core which is richer in PE is surrounded by a darker colored shell which is richer in PS. The FTIR results showed 17 wt % and 83 wt % of PS and PE respectively in the core and 83 wt % and 17 wt % of PS and PE respectively in the shell. The core is significantly richer in PE while the shell is richer in the PS.

EXAMPLE 4
HDPE+PP, Viscosity Ratio 9.3, Segregation

In this example pellets of polypropylene and high density polyethylene with composition ratio of 30 to 70 respectively were dry blended and fed to the polymer segregation process. The properties of the materials used as feed are shown in TABLE II below. The processing conditions were the same as Example 1. The temperatures along the extruder barrel and segregation part were 155° C., 195° C., 195° C., 195° C. and 210° C. The extruder was operated at 20 r.p.m. The viscosity ratio of the blend ($\eta_{PE}/\eta_{PP}$) at experimental conditions was 9.3. The optical photomicrograph of the extrudate perpendicular to the flow direction is shown in FIG. 5. The picture shows a white colored core which is richer in PE surrounded by a darker colored shell which is richer in PP. The segregation obtained is shown in TABLE III below.

TABLE II

| Polymer | Manufacturer | Trade Name | Density (g/cm$^3$) | MFI D1238 (g/10 min) |
|---|---|---|---|---|
| High Density Polyethylene (HDPE) | FINA Oil & Chemical | 7208 | 0.959 | 0.6 |
| Polypropylene (PP) | Philips Petroleum | Hgx-010 | 0.902 | 12 |

TABLE III

| Core | | Shell | |
|------|------|-------|------|
| | (wt %) | | (wt %) |
| PP | 11 | PP | 89 |
| PE | 89 | PE | 11 |

EXAMPLE 5
PP+PS, Viscosity Ratio 5.6, Segregation

In this example, polypropylene (Montel JE 6100) was dry blended with polystyrene (Styron 615APR) in the ratio 40:60 composition by mass respectively and fed to a single screw extruder with metering screw which was equipped with a segregation tube. The process was the same as in Example 1. The properties of the polymers used in the feed are shown in TABLE IV. The temperatures along the extruder barrel and segregation tube were 145° C., 185° C., 190° C., 195° C., and 195° C. The extruder was operated at 20 r.p.m. The viscosity ratio of the blend ($\eta_{PP}/\eta_{PS}$) at experimental conditions was 5.6. The segregation obtained is tabulated in TABLE V below.

TABLE IV

| Polymer | Manufacturer | Trade Name | Density (g/cm$^3$) | MFI D1238 (g/10 min) |
|---------|--------------|------------|---------|----------|
| Polypropylene (PP) | Montell Polyolefins | JE 6100 | 0.904 | 2.1 |
| Polystyrene (PS) | Dow Chemical | 615APR | 1.04 | 15 |

TABLE V

| Core | | Shell | |
|------|------|-------|------|
| | (wt %) | | (wt %) |
| PS | 28 | PS | 72 |
| PP | 72 | PP | 28 |

EXAMPLE 6
HDPE+EVA, MFI Ratio 0.28, Segregation

High density polyethylene (HDPE,08454N) was melt blended with ethylene vinyl acetate copolymer (EVA, ELVAX250) in the ratio of 70:30 weight percent respectively in the single screw extruder-segregation tube equipment of Example 1. TABLE VI shows properties of the feed polymers. The temperature along the extruder barrel and the die were 155° C., 170° C., 170° C., 170° C. and 170° C. The extruder was operated at a screw speed of 10 rpm. The melt flow index ratio of the HDPE/EVA is about 0.28. Test specimens were collected from the tubular die at a distance of 70 cm from the exit of the extruder after cooling the sample to the room temperature. The sample was examined by optical microscopy and microscopic FTIR spectroscopy. The samples possess a core-shell morphology where most of the high viscosity HDPE forms the core and most of the low viscosity EVA forms the shell region. It was confirmed by microscopic FTIR analysis that there was 77 wt % and 23 wt % of EVA and HDPE respectively in the shell region and there are 23 wt % and 77 wt % of EVA and HDPE respectively in the core, see TABLE VII below.

EXAMPLE 7
HDPE+EVA, MFJ Ration Unity Exhibiting No Segregation

In this example, the process and experimental conditions are carried out similar to Example 6 except that the viscosity ratio of the two polymers, as indicated by the ratio of the melt flow index of HDPE (08454N) to EVA (ELVAX260), was very close to one (see TABLE VI). The morphology of this HDPE/EVA (70/30) blend system has no clear core-shell structure. The microscopic FTIR results showed that the ratio of the content of HDPE to EVA in the core or in the shell is almost the same, which is close to 70/30, see TABLE VII. This means no significant separation was obtained compared with the original composition of the extruder feed.

TABLE VI

| Polymer | Manufacturer | Grade Number | Melt Flow Index(g/10 min) |
|---------|--------------|--------------|---------------------------|
| HDPE | Dow Plastics | 08454N | 7.0 |
| | | 25455N | 25.0 |
| EVA | Dupont | ELVAX250 | 25.0 |
| | | ELVAX265 | 3.0 |
| | | ELVAX260 | 6.0 |

TABLE VII

| Example No. | Composition of HDPE/EVA in the feed | MFI Ratio of HDPE/EVA | Composition of HDPE/EVA in the shell | Composition of HDPE/EVA in the core |
|-------------|-------------------------------------|----------------------|--------------------------------------|-------------------------------------|
| 6 | 70/30 | 0.28 | 23/77 | 77/23 |
| 7 | 70/30 | 1.17 | 70/30 | 70/30 |

EXAMPLE 8
HDPE+EVA+Glass Beads, Glass Beads in EVA Rich Shell

HDPE was melt blended with 1 wt. % (based on the total weight of HDPE and EVA) of glass beads (GB) (250 μm diameter, acid washed, #5-9203, SUPPELCO) in a single screw extruder, operated at 200° C. and 25 rpm. The pelletized extrudate was tumble blended with 30 wt. % of EVA (based on the total weight of HDPE and EVA) and fed to a single screw extruder. Segregation was achieved in a segregation tube which was attached to the exit of the extruder. The temperature of the tube was maintained at 170° C. The segregation process was carried out at a screw speed of 10 rpm. Test specimens were collected from (a) the exit of the segregation tube, which was air-cooled to room temperature and (b) from the segregation tube at a distance of 70 cms from the exit of the extruder (in the direction of flow), after 'freezing' the sample in the segregation tube. Freezing was done by switching off the heaters on the segregation tube immediately after turning off the motor of the extruder and by allowing it to cool to room temperature. Specimens were taken by opening the segmented tube and forcing the solid polymer out of the segregation tube. The extruder was gravity fed and was running at the set speed, when the motor was turned off.

Thin sections were made from samples 'a' and 'b' using a microtome and were examined under optical microscope. FIG. 6 shows the cross section of sample 'b'. It can be seen that all GB have migrated/segregated into outer layer (skin) of the specimen and that the core is free of GBs. The thin layer of EVA containing GBs had a thickness of ~0.7 mm (in the radial direction). The details of the polymers employed in the study are given in TABLE VIII.

TABLE VIII

| Polymer | Manufacturer | Grade No. |
|---|---|---|
| HDPE | Dow Plastics | 10462N |
| rHDPE | Nuplast | — |
| EVA | Dupont | ELVAX260 |
| PMMA | AtoHaas | Plexiglas V826 |

EXAMPLE 9

Recycled HDPE+EVA+Glass Beads, Glass Beads and Some Other Particulates in EVA Rich Shell HDPE was melt blended with 1 wt. % (based on the total weight of HDPE and EVA) of GB (250 $\mu$m diameter, acid washed surface, #5-9203, SUPPELCO) in a single screw extruder, operated at 220° C. and 25 rpm. The pelletized extrudate was tumble blended with 30 wt. % of EVA (based on the total weight of HDPE and EVA) and fed to a single screw extruder. (See Table VIII for details on the feed polymers.) Segregation was achieved in a segregation tube of 110 cm length and 8 mm diameter, which was attached to the exit of the extruder. The temperature of the tube was maintained at 190° C. for its entire length. The segregation process was carried out at a screw speed of 10 rpm. Test specimens were collected from (a) the exit of segregation tube, which was air-cooled to room temperature and (b) from the segregation tube at a distance of 70 cms from the exit of the extruder (in the direction of flow), after 'freezing' the sample in the segregation tube. Freezing was done by switching off the heaters on the segregation tube immediately after turning off the motor of the extruder and by allowing it to cool to room temperature. Specimens were taken out by opening the segmented tube and forcing the solid polymer out of the segregation tube. The extruder was gravity fed and was running at the set speed, when the motor was turned off.

Thin sections were made from samples 'a' and 'b' using a microtome and were examined under optical microscope. FIG. 7 shows the cross section of sample 'b'. It can be seen that all GB as well as particles present in the recycled HDPE have migrated/segregated into outer layer (skin) of the specimen and that the core is free of such particles. Again skin material was characterized to be comprised predominantly of EVA The thin layer of EVA containing GBs had a thickness of ~0.7 mm (in the radial direction).

EXAMPLE 10

HDPE+PMMA+Glass Beads, Glass Beads in PMMA Rich Core

HDPE was melt blended with 1 wt. % (based on the total weight of HDPE and polymethyl methacrylate (PMMA)) of GB (75 $\mu$m diameter, acid washed surface, #5-9200, SUPPELCO) in a single screw extruder, operated at 220° C. and 25 rpm. The pelletized extrudate was tumble blended with 30 wt. % of PMMA (based on the total weight of HDPE and PMMA) and fed to a single extruder. (See TABLE VIII for details on the feed polymers.) Segregation was achieved in a segregation tube of 110 cm length and 8 mm diameter, which was attached to the exit of the extruder. The temperature of the tube was maintained at 200° C. The segregation process was carried out at a screw speed of 10 rpm. Under these conditions the viscosity of PMMA was much higher than that of the HDPE.

Test specimens were collected from (a) the exit of segregation tube which was air-cooled to room temperature and (b) from the segregation tube at a distance of 70 cms from the exit of the extruder (in the direction of flow in the tube), after 'feezing' the sample in the segregation tube. Freezing was done by switching off the heaters on the segregation tube immediately after turning off the motor of the extruder and by allowing it to cool to room temperature. Specimens were taken by opening the segmented tube and forcing the solid polymer out of the segregation tube. The extruder was gravity fed and was running at the set speed, when the motor was turned off.

Figure 8:
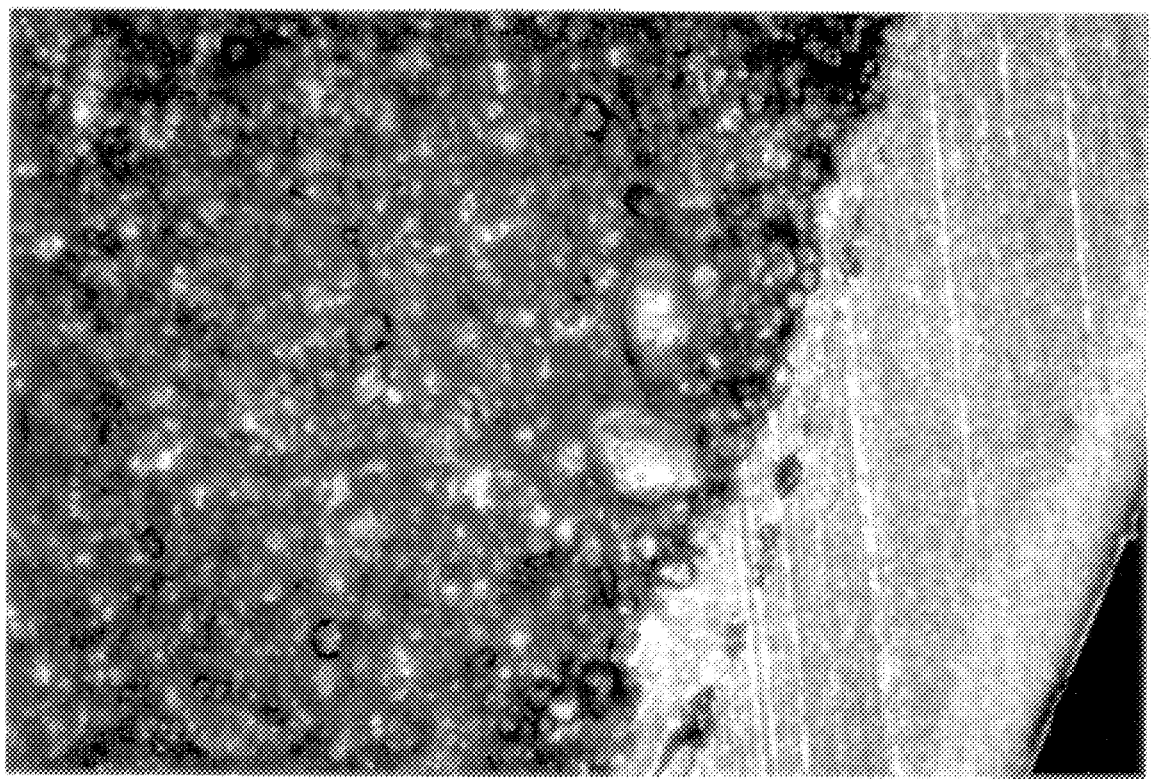
FIG. 8 is a photomicrograph showing glass beads segregated from a mixture of high density polyethylene and poly(methyl methacrylate) where PMMA had a higher viscosity than the polyethylene and in which segregation of the PMMA from the HDPE is also evident, details of the process giving this structure are given in Example 10 described hereinafter.

Thin sections were made from samples 'a' and 'b' using a microtome and were examined using an optical microscope. FIG. 8 shows the cross section of sample 'b'. It can be seen that all GB have migrated/segregated to the PMMA core of the specimen and that the skin is free of GBs. The phase separation obtained in HDPE/PMMA systems appeared much more distinct than in HDPE/EVA systems. This is attributed to PMMA being much more immiscible in HDPE than is EVA in HDPE.

EXAMPLES 11–13

Segregation Without a Segretation Tube

Polymers used for these examples are shown in TABLE IX. All of the polymers were used in pellet form as received from the manufacturer.

TABLE IX

| Polymer Name/(symbol) | Manufacturer | lot# | Melt Flow Index* |
|---|---|---|---|
| Fina 7208(FINA) HDPE | Fina Oil and Chemical | 50663 | 0.6 |
| Styron (PS2) 615APR6CLR Polystyrene | Dow Chemical Canada | CS940725540 | 15 |
| HGX-010-01 (HGX) Polypropylene | Phillips Petroleum Company | 29-3-2292 | 12 |

*ASTM D-1238

Extrusion equipment consisted of a C. W. Brabender ¾" single screw extruder using a C. W. Brabender PL-2000 Computerized Plasti-Corder Torque Rheometer attachment for monitoring of conditions (torque, extruder barrel temperature, exit melt temperature and pressure). Extruder barrel length was approximately 18" measured from feed to exit, and housed a ¾" diameter screw with uniform thread spacing along its length. The extruder die was 3" long and contained a single 10 mm hole.

Temperature control within the extruder barrel and transition piece was achieved using PID controllers. Extrudate samples were collected and thinly sectioned (~60 $\mu$m) using a Rotary Microtome manufactured by American Optical Company (model 820, serial#25104) and equipped with a stainless steel knife blade (Microview 7800). Composition of the core of each sample was directly measured by Fourier Transform Infrared Microscopy using a Mattson Galaxy 6020 FTIR Spectrophotometer equipped with a mercury-cadmium-telluride (MCT) detector. The procedure involved masking the sample so that only a small portion of the core was visible to the FTIR beam. The composition of the shell was obtained by calculation knowing the diameter of the core, the composition of the feed and the FTIR measured composition of the core. Photographs of the sectioned samples were obtained using a E61 8 mm Canovision 8 Video Camcorder connected to a computer interface. Black and white computer images were obtained using Global Lab Image, an image processing and analysis software package.

Polymer blends were obtained by manually mixing the pellets. Blends were fed in scoopfuls manually to the hopper to avoid any segregation that could result from pouring.

Extrusion conditions that were varied were barrel temperature (Zones T1, T2, T3), die temperature (T4). Melt exit temperature (Tm) was also measured. Flowrates were measured by weighing extrudate samples taken over 1 minute time intervals. Samples were collected after conditions (temperatures, torque) were observed to reach steady state. Experiments that were conducted are tabulated in TABLE X below.

TABLE X

| Exam. | Poly. Blend | Comp % by mass | Mass Flow g/min. | T1(°C.) | T2(°C.) | T3(°C.) | T4(°C.) | RPM |
|---|---|---|---|---|---|---|---|---|
| 11 | PS2/ HGX | 60/40 | 22.78 | 155 | 185 | 185 | 185 | 20 |
| 12 | HGX/ FINA | 30/70 | 25.60 | 155 | 195 | 195 | 195 | 20 |
| 13 | PS2/ FINA | 60/40 | 24.79 | 155 | 185 | 185 | 185 | 20 |

Figure 9:
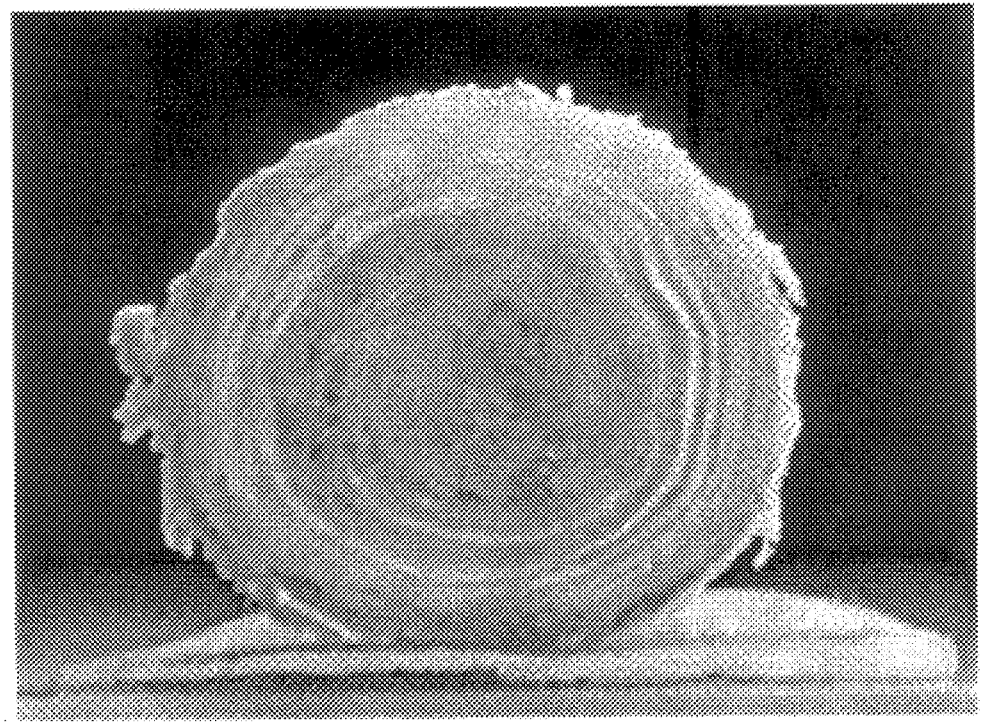
FIG. 9 is a photomicrograph showing segregation of a polystyrene-polypropylene mixture using an extruder not equipped with a segregation tube, the details of the process to produce this structure are given in Example 11 described hereinafter.
Figure 10:
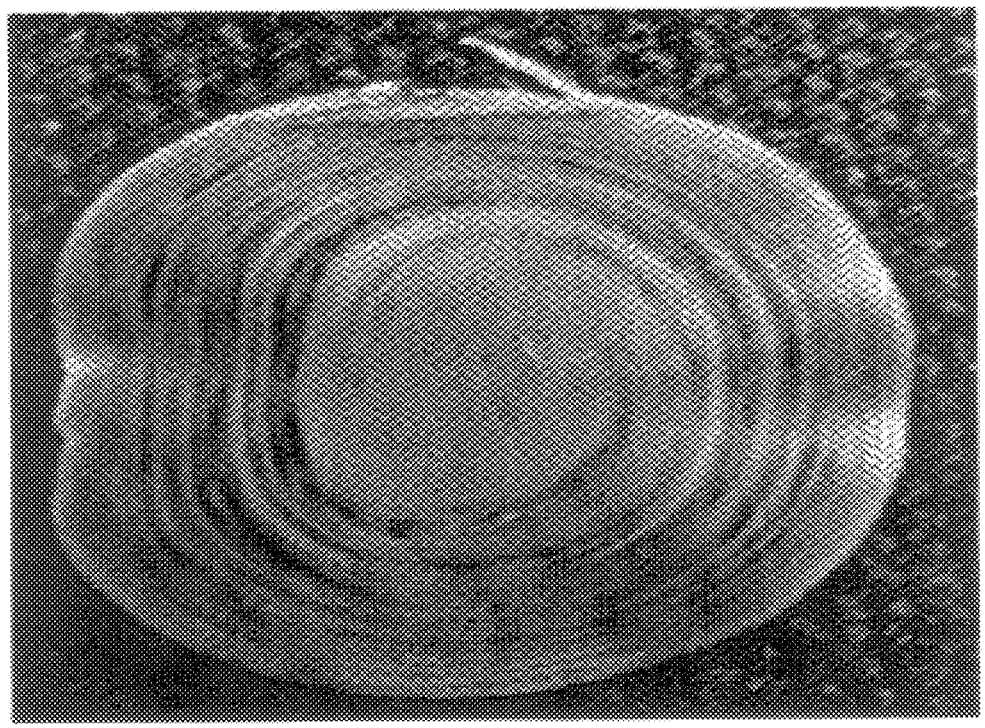
FIG. 10 is a photomicrograph showing segregation of a high density polyethylene-polypropylene mixture using an extruder not equipped with a segregation tube, the details of the process to produce this structure are given in Example 12 described hereinafter.
Figure 11:
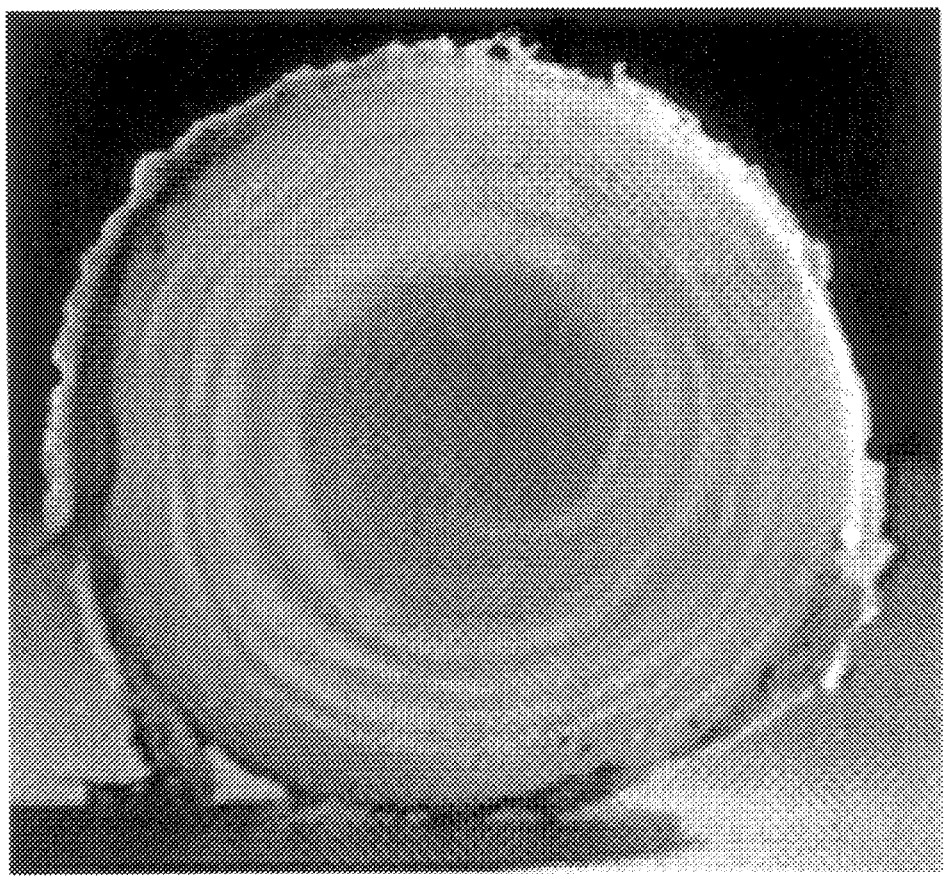
FIG. 11 is a photomicrograph showing segregation of a polystyrene-high density polyethylene mixture using an extruder not equipped with a segregation tube, the details of the process to produce this structure are given in Example 13 described hereinafter.

FIGS. 9 to 11 shows the core-shell morphologies obtained for each of the runs of TABLE X. These results show that a "tree-ring" core shell structure results. The core is significantly richer in one polymer while the shell is richer in the other when the extruder alone is used. TABLE XI shows compositions measured for three runs. In all cases the composition of the core is significantly different from that of the shell.

TABLE XI

RESULTS OF FTIR MEASUREMENT OF COMPOSITION

| | | Extruder Output | |
|---|---|---|---|
| Example | Feed | Core | Shell |
| 11 | 60% PS | 40% PS | 75% PS |
|  | 40% PP | 60% PP | 25% PP |
| 12 | 70% PE | 82% PE | 66% PE |
|  | 30% PP | 18% PP | 34% PP |
| 13 | 60% PS | 29% PS | 78% PS |
|  | 40% PE | 71% PE | 22% PE |

It will be understood that the above examples are meant to be illustrative only. Those skilled in the art will appreciate that the process of the present invention is applicable to recycling of many commercially significant plastic-based products. Examples include 1) separation of nylon from polypropylene and poly(ethylene terephthalate) from polypropylene in waste carpeting; 2) separation of polyethylene from polypropylene in the waste from the manufacture of disposable diapers, typically the leg cut-outs); separation of polycarbonate and acrylonitrile-butadiene-styrene (ABS) from waste automotive parts; 3) separation of poly (vinylidine chloride) coating from polypropylene; 4) separation of auto-fluff (auto fluff contains a variety of plastics, glass particles, rusted steel particles etc. as a result of the automobile recycling process; 5) separation of microgels from polyolefins for high quality films; 6) separation of catalyst particles remaining from the polymerization process; 7) a reduction of pigment content of recycled polymers; 8) removal of polyisobutylene from linear low density polyethylene in waste stretch wrap; and 9) separation of polymers contained in disposable cameras (e.g. ABS, polystyrene etc.).

While the process of segregation of the present has been discussed with reference to particular examples and mechanisms of inducing segregation, those skilled in the art would understand that numerous variations of the process may be made without departing from the scope of the invention described herein.

Therefore what is claimed is:

1. A method for segregating constituents of polymer mixtures, wherein said constituents comprise polymers and additives, the method comprising the steps of:

providing a polymer mixture, heating the polymer mixture until it is in a flowable state and flowing the polymer mixture in a first direction;

segregating said polymer mixture by inducing migration of at least one of said constituents relative to the other constituents of the polymer mixture in a direction substantially transverse to the first direction; and after a preselected amount of segregation solidifying the segregated polymer mixture.

2. The method according to claim 1 wherein said constituents comprise polymers to be segregated each having a different viscosity, and wherein the step of inducing migration of at least one of the polymer constituents comprises increasing differences in viscosity between the polymer constituents during flow in said first direction.

3. The method according to claim 2 wherein the step of increasing the viscosity difference comprises addition of more of said at least one polymer to increase the viscosity difference between the remaining polymer constituents and the preselected polymer constituent.

4. The method according to claim 2 wherein the step of increasing the viscosity difference comprises selectively varying temperature of the polymer mixture in said first direction.

5. The method according to claim 2 wherein the step of increasing the viscosity difference comprises chemically inducing a change in the viscosity of at least one of the polymer constituents.

6. The method according to claim 1 wherein the constituents comprise polymer constituents and additives, wherein the step of inducing migration comprises addition to the polymer mixture of a constituent effective to associate with said additives.

7. The method according to claim 1 including the step of separating and collecting segregated portions of said polymer mixture before the step of solidifying the segregated polymer mixture.

8. The method according to claim 1 wherein the step of flowing said polymer mixture comprises extrusion and die forming said polymer mixture for forming a layered solid.

9. The method according to claim 1 wherein the step of inducing migration of said at least one of said constituents comprises mechanically inducing shear in said polymer mixture to selectively vary flow velocity of the flowing polymer mixture at different points in the transverse and in said first direction.

10. The method according to claim 1 wherein said step of heating is conducted in an extruder means.

11. The method according to claim 10 including flowing said heated polymer mixture through a heated tube member attached to said extruder means.

12. The method according to claim 11 wherein said tubular member defines a radial direction, and wherein said transverse direction is in the radial direction.

13. A method for recycling waste plastics containing constituents comprising polymers and additives, the method comprising the steps of:

providing a waste plastic, heating the waste plastic producing a flowable polymer mixture and flowing the flowable polymer mixture in a first direction;

segregating said polymer mixture by inducing migration of at least one of the constituents relative to the other constituents of the polymer mixture in a direction substantially transverse to the first direction;

after a preselected amount of segregation collecting segregated portions of said polymer mixture; and solidifying the collected portions.

14. The method according to claim 13 wherein said constituents comprise polymers to be segregated each having a different viscosity, and wherein the step of inducing migration of at least one of the polymer constituents comprises increasing differences in viscosity between the polymer constituents.

15. The method according to claim 14 wherein the step of increasing the viscosity difference comprises addition of more of said at least one polymer constituent to increase the viscosity difference between the remaining polymer constituents and the preselected polymer constituent.

16. The method according to claim 14 wherein the step of increasing the viscosity difference comprises applying a preselected temperature differential to the polymer mixture in said first direction.

17. The method according to claim 14 wherein the step of increasing the viscosity difference comprises chemically inducing a change in the viscosity of at least one of the polymer constituents.

18. The method according to claim 13 wherein the constituents comprise polymer constituents and additives, the step of increasing the viscosity difference comprises addition to the polymer mixture of a constituent effective to associate with said additives.

19. The method according to claim 13 wherein said step of heating is conducted in an extruder means.

20. The method according to claim 19 including flowing said heated polymer mixture through a heated tube member attached to said extruder means, wherein the step of inducing migration in said at least one constituent is carried out in the extruder means and in the tube member.

21. The method according to claim 20 wherein said tube member defines a radial direction, and wherein said transverse direction is in the radial direction.

22. A method for producing a polymer based product having a layered structure, the product being formed from a mixture of constituents which comprise polymers and may comprise additives, the method comprising:

providing a polymer mixture, heating the polymer mixture until it is in a flowable state;

segregating said polymer mixture by inducing migration of at least one of the constituents relative to the other constituents of the mixture in a direction substantially transverse to a first direction;

extruding and die forming the polymer mixture in the first direction; and after a preselected amount of segregation solidifying the extrudate.

23. The method according to claim 22 wherein the step of inducing migration of said at least one of said constituents comprises mechanically inducing shear in said polymer mixture to selectively vary flow velocity of the flowing polymer mixture at preselected positions in the transverse and in said first direction.

24. The method according to claim 22 wherein said constituents comprise polymers to be segregated each having a different viscosity, and wherein the step of inducing migration of at least one of the polymer constituents comprises increasing differences in viscosity between the polymer constituents during flow in said first direction.

25. The method according to claim 24 wherein the step of increasing the viscosity difference comprises addition of more of said at least one polymer to increase the viscosity difference between the remaining polymer constituents and the preselected polymer constituent.

26. The method according to claim 24 wherein the step of increasing the viscosity difference comprises selectively varying temperature of the polymer mixture in said first direction.

27. The method according to claim 24 wherein the step of increasing the viscosity difference comprises chemically inducing a change in the viscosity of at least one of the polymer constituents.

28. The method according to claim 24 wherein the constituents comprise polymer constituents and additives, wherein the step of inducing migration comprises addition to the polymer mixture of a constituent effective to associate with said additives.

29. The method according to claim 8 wherein a compatibilizer or adhesive tie-layer is added to the polymer mixture before or during processing thereof.

30. The method according to claim 22 wherein a compatibilizer or adhesive tie-layer is added to the polymer mixture before or during processing thereof.

31. The method according to claim 22 including extruding said heated polymer mixture through an extruder having a heated tube member attached thereto, wherein the step of inducing migration in said at least one constituent is carried out in the extruder means and in the tube member.

32. The method according to claim 22 wherein said tube member comprises multiple tubes in parallel attached to a central tube which is attached to said extruder, each of said multiple tubes including a die for producing a die formed product.

* * * * *